UNITED STATES PATENT OFFICE.

CARL A. BLACK, OF CLEVELAND, AND WILLIAM H. TEARE, OF LAKEWOOD, OHIO; SAID BLACK ASSIGNOR OF ONE-THIRD OF HIS RIGHT, AND SAID TEARE ASSIGNOR OF ALL OF HIS RIGHT TO JOHN R. COWILL, OF TOLEDO, OHIO.

FERTILIZER AND PROCESS OF PRODUCING SAME.

1,121,324.

Specification of Letters Patent. Patented Dec. 15, 1914.

Application filed March 9, 1914. Serial No. 823,573.

No Drawing.

*To all whom it may concern:*

Be it known that we, CARL A. BLACK and WILLIAM H. TEARE, citizens of the United States, and residents, respectively, of Cleveland, in the county of Cuyahoga and State of Ohio, and Lakewood, in the county of Cuyahoga and State of Ohio, have invented a certain new and useful Improvement in Fertilizers and Processes of Producing Same, of which the following is a full, clear, and exact description.

This invention relates to a new product in the form of a fertilizer or fertilizer material (which may be mixed with other fertilizing ingredients) to be ultimately used for enrichment of the soil, and to the method of producing the same.

We employ as the basis of our process and for the raw material from which our new commercial product is produced loggerhead sponge which is a natural product found in the sea in certain semi-tropical regions.

Loggerhead sponge has never before been employed commercially for any useful purpose, but on the other hand by reason of its rapid decomposition and offensive odors resulting therefrom, has been very undesirable and also very injurious to the commercial sponge industry. However, we have found that this substance heretofore generally regarded as useless is available by our process for the production of an efficient commercial product in the form of a fertilizer similar in many respects to animal tankage as produced by slaughter houses, and also guano. In other words, by our process, a natural product heretofore regarded as useless and detrimental in many respects, is converted to a commercial product which can be shipped and stored, and ultimately used for fertilizing purposes.

An understanding of the advantages and characteristics of our new product will perhaps best be obtained from a consideration of the process, which briefly stated, consists in treating the raw material in such a way as to forestall premature decomposition and putrefaction; to prevent spontaneous combustion; to secure partial sterility and concentration of the ingredients useful for soil enrichment; and in further treating the material so as to render it suitable for absorption by the soil or by the living plant.

Considering now the process in more detail, it may be stated that the loggerhead sponge after being brought in from the sea is allowed to drain for a suitable length of time, and after being cut into sections or pieces of convenient size, is dried to a definite moisture content, thus causing the concentration and partial sterility, and then ground to a definite grade of fineness. We carry this process through with promptness if possible, but if the sponge cannot be subjected to the drying process within a few hours from the time it is removed from the sea, it is essential to subject the wet sponge to a treatment with antiseptic chemicals to prevent putrefaction and consequent loss of valuable material, as well as nuisance from foul odors, preliminary to its manufacture into fertilizer material.

Assuming for the time being that the sponge can be subjected to the drying process within the required time from its removal from the sea, the sponge is placed in a drier which may be a direct heat drier, although steam or other heating medium may be utilized. It is not aimed to completely dry or desiccate the material, but only to deprive it of sufficient water to admit of the sponge afterward being ground to a definite fineness and to be stored or shipped without danger of decomposition or spontaneous combustion, and also to avoid absolute sterility and danger of restricting the bacterial activity of the material when in the soil. In consequence, we dry the material down to a moisture content of six per cent. or less. If there is more than six per cent. of moisture in the material, the material is liable to decompose in storage, giving off an offensive odor and resulting in loss of ammonia, and it is also quite susceptible to spontaneous combustion, rendering the product unsafe for shipment or storage. If on the other hand, the material is dried to a point such that all or practically all the moisture is removed therefrom, there is danger of decomposition in storage, as when an insufficient amount of moisture is removed from the material. Another object in leaving a small amount of moisture present is to prevent rendering the material sterile, or reducing its bacterial activity in the soil. We have found that if material is absolutely dry, it is not sufficiently susceptible to the chemical changes in the soil which are necessary to its absorption by the living plants.

If the heating and drying process cannot be initiated very shortly after the product is removed from the sea, the antiseptic chemical treatment is resorted to as previously stated. This consists in subjecting the material to an inexpensive antiseptic chemical, such as sulfurous acid gas, or to the gas produced from burning sulfur or sulfids. We find that this treatment temporarily retards putrefaction without interfering in any way with the subsequent steps of the process, or affecting the quality or efficiency of the product.

After the material has been dried to a definite moisture content of six per cent. or less, the now dried material is ground to a definite state of granulation or fineness,—that is to a mixture of fines and coarse, which experience has shown to have peculiar advantage from an agricultural standpoint. We have found that certain proportions of fines and coarse in admixture were necessary to secure the best results in the soils which it is particularly desired to ameliorate, this being the porous sandy soils found in certain portions of this country, particularly in Florida and other sections of the South. The specific objects in view in thus producing a state of definite granulation are first, retention of moisture accomplished by the presence of the larger grains; second,—rapid decomposition accomplished by the presence of the smaller grains; and third,—of avoiding danger of a considerable percentage of the material being carried through the interstices of the soil, and thus completely lost before being subjected to the chemical processes preceding plant absorption.

The proportion of different size granules which we have found peculiarly advantageous from the standpoint of moisture retention, resistance to leeching by rains, and promotion of soil activity are set forth below, it being assumed that the material is screened through the various sieves mentioned, using the sieves in the order named. All material to pass through a sieve with openings $\frac{1}{4}$ inch square; 20 to 25 per cent. to remain on a sieve with openings $\frac{1}{8}$ inch square, 20 to 25 per cent. to remain on a sieve with openings $\frac{1}{16}$ inch square, 20 to 25 per cent. to remain on a sieve having 30 square meshes to the lineal inch. All the remainder to pass through a sieve having 30 square meshes to the lineal inch. This results in a finished product which can be safely shipped and stored, and is directly available, first, for soil enrichment; second,—for admixture with other materials having fertilizer value, making a mixed fertilizer; and, third,—for the production of acidulated fertilizer.

In its simplest and principal form, namely the non-acidulated variety, as produced by the process above described, the fertilizer possesses the average composition which on analysis shows the following results: organic matter (animal) 40 to 60 per cent., nitrogen, as ammonia, ($NH_3$) 6 to 7 per cent., calcium carbonate ($CaCo_3$) 4 to 6 per cent., phosphate of calcium ($Ca_3Po4_2$) 1 to 2 per cent., potash in organic combination ($K_2O$) $\frac{1}{2}$ to 1 per cent., moisture $\frac{1}{2}$ to 6 per cent.

For the production of the acidulated variety, the dried and ground material as described above may be used as the raw material, although for acidulating, it is not necessary to use material of a definite moisture content, or a definite grade of fineness, as before described. For making the acidulated goods, all that is necessary is to have the sponge apparently dry to the touch, and crush down to a fairly fine powder. It is then mixed with sulfuric acid in the proportion of approximately 90 per cent. dried sponge, and approximately 10 per cent. sulfuric acid. The objects accomplished by this mixing are the conversion of the carbonate of lime present to sulfate of lime, which is known to be more valuable in the soil, especially under certain conditions; the conversion of the sodium chlorid present to sodium sulfate, as some soils already contain an excess of the former; the conversion of the phosphoric acid present from the insoluble to the soluble variety; the conversion of the nitrogen present to ammonium sulfate; and finally the breaking down of the cellulose, so that the processes of decay in the soil and ultimate absorption by the plant may be assisted. The acidulated product so produced is better adapted to some soils requiring rapid absorption, whereas to some soils and to some conditions, the non-acidulated product is productive of better results and is cheaper.

The acidulated product or variety and the process of producing the same constitute the subject matter of a divisional application filed by us on the 24th day of July, 1914, #852,865, entitled fertilizer and process of producing the same.

Having thus described our invention, what we claim is:—

1. A fertilizer material consisting of loggerhead sponge dried and granulated.

2. A product of manufacture consisting of loggerhead sponge dried to a definite moisture content and granulated.

3. A product of manufacture for uses as a fertilizer consisting of loggerhead sponge dried to a moisture content of not more than six per cent. and granulated.

4. An article of manufacture for use as a fertilizer or fertilizer material consisting of loggerhead sponge, dried and ground to a definite state of granulation or fineness.

5. An article of manufacture for use as a fertilizer or fertilizer material consisting of loggerhead sponge dried and granulated to a definite admixture of sizes of particles.

6. A process of producing a fertilizer from loggerhead sponge which comprises treating the sponge to prevent putrefaction and spontaneous combustion, and granulating the material thus treated.

7. The process of treating loggerhead sponge which comprises preventing putrefaction and spontaneous combustion by drying, and reducing the dried product to a state of granulation.

8. A process of producing a commercial fertilizer from raw loggerhead sponge which comprises drying the sponge to a definite moisture content and reducing the dried product to a state of granulation.

9. A method of producing a commercial fertilizer from raw loggerhead sponge which comprises subjecting the sponge to the action of a sterilizing chemical, thence drying the material to a predetermined moisture content, and then granulating the material.

10. A method of producing a commercial fertilizer from raw loggerhead sponge which comprises producing partial sterility of the material and concentration of the fertilizing ingredients of the material, and reducing the material to a granulated state.

11. A process for the production of a commercial fertilizer from raw loggerhead sponge which comprises drying the sponge to a moisture content of not more than six per cent., and reducing the dried product to a state of granulation.

12. A process for producing a commercial fertilizer from raw loggerhead sponge which comprises drying the sponge before it is in a state of putrefaction, to a moisture content of not more than six per cent., and thence reducing the dried product to a state of granulation.

13. A process for the production of a commercial fertilizer from raw loggerhead sponge which comprises treating the sponge so as to prevent putrefaction and spontaneous combustion, by drying the sponge to a moisture content of not more than six per cent., and reducing the product to a state of granulation consisting of an admixture of granulations having a definite range of sizes.

In testimony whereof, we hereunto affix our signatures in the presence of two witnesses.

CARL A. BLACK.
WILLIAM H. TEARE.

Witnesses:
A. F. KWIS,
L. I. PORTER.